Aug. 13, 1940.    S. RUBEN    2,211,583
METHOD OF MAKING ELECTRIC CONDENSERS AND CONDENSERS MADE THEREBY
Filed Dec. 13, 1939
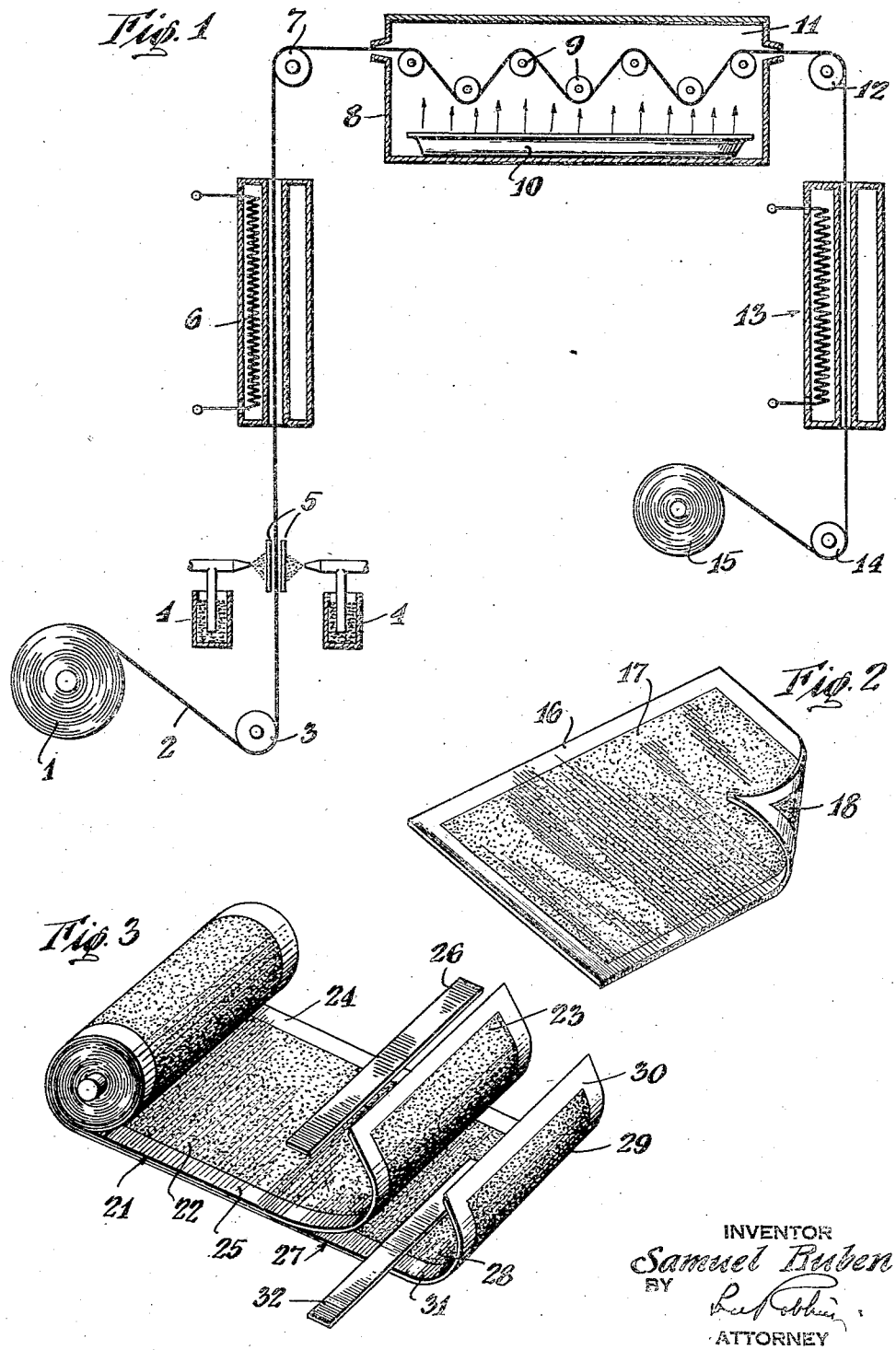
INVENTOR
Samuel Ruben
BY
ATTORNEY Patented Aug. 13, 1940

2,211,583

UNITED STATES PATENT OFFICE 2,211,583

METHOD OF MAKING ELECTRIC CONDENSERS AND CONDENSERS MADE THEREBY

Samuel Ruben, New Rochelle, N. Y.

Application December 13, 1939, Serial No. 308,895

12 Claims. (Cl. 91—68)

This invention relates to electric condensers and specifically to a condenser having armatures of metal coated directly on the dielectric spacer.

An object of the invention is the provision of a method for making an electrostatic condenser of a new and improved form which possesses high capacitance, which may be simply and economically manufactured, which has a low power factor, high voltage breakdown and which may be constructed in a smaller size for a given capacity than electrostatic condensers heretofore made.

A further object is the provision of an electrostatic condenser comprising an armature of extreme thinness intimately bonded to the dielectric spacer element.

Another object is the provision of a method for making a unitary condenser structure comprising an electrode of conductive finely divided metal upon a non-fibrous dielectric sheet spacer.

An object of the invention is to provide an electrostatic condenser in which the electrodes are in the form of metal particles joined together to form a low resistance conductive path over the entire electrode surface. A specific object is the utilization of such an electrode in unitary relationship with a dielectric comprising a non-fibrous sheet dielectric film, the electrode being sprayed or otherwise deposited upon the dielectric sheet.

A further object is to provide methods for making such condensers.

Other objects will be apparent from the disclosures and from the drawing in which Fig. 1 illustrates the apparatus used in the manufacture of the condenser, Fig. 2 is a view of a simple condenser structure and Fig. 3 is a view in perspective of a semi-finished condenser made according to the invention.

The invention comprises the use of a dielectric sheet, such as regenerated sheet cellulose, ethyl cellulose, cellulose acetate, styrene, polyvinyl chloride, polyvinyl acetol, hard, parchmentized, impregnated or coated paper, etc., an electrode comprising a coating of finely divided copper base metal held on said sheet by a binder, and a method for rendering the otherwise non-conductive finely divided metal particle coating conductive over the entire area of the electrode.

Heretofore, there have been many attempts in the art to produce electrostatic capacitance by depositing conductive particles on sheet dielectric materials. Such processes have involved the use of finely divided carbon, tin, graphite, atomized metal sprays and sputterings. The methods tried, however, have been impracticable due to several limitations such as excessive cost, rigidity of coating, lack of uniformity, etc. These disadvantages have offset the large advantage derived from the intimate contact between the deposited electrode and the dielectric.

In an endeavor to produce a sprayed electrode condenser which would possess the advantage of a bonded unitary dielectric-electrode assembly and which would be free of the limitations heretofore encountered in the art, I have found the following: If a dielectric sheet material such as regenerated cellulose, is coated by spraying thereon a thin layer of copper-bronze powder, even though a very small amount of binder is used, the coating is practically non-conductive, the resistance being of an unusably high value such as 2,000,000 ohms for a strip of one inch wide one inch long and .5 mil thick. This high resistance, I have determined, is due to the high contact resistance between the particles.

Further, I have discovered that the non-conductivity or high resistance of these films of copper alloys, such as the bronze powders, is apparently due to a highly superficial layer of cuprous or other oxides on the surface of the particles, invisible to the naked eye, and that if this oxide layer is removed, as by reduction to the metal in situ by contact galvanic effect in the presence of an halogen acid vapor, the resistance drops and a highly conductive layer is obtained.

The preferred method is to spray a copper bronze powder onto the dielectric sheet, for instance ethyl cellulose, using a quick drying binder such as a solution of two ounces of nitrocellulose in one gallon of amylacetate. This solution forms a porous skin between the particles and allows them to be treated. After the sprayed film is dried, it is passed through a chamber which contains an atmosphere of hydrochloric acid vapor. The contact of the hydrochloric acid vapor or gas with the bimetal bronze (such as zinc copper) causes a galvanic action to occur at the interface of the contacting particles, and when a meter is connected across two sections of the coating the resistance can be observed to rapidly drop. For example, a strip 1" wide 1" long, had a resistance of 2,000,000 ohms. After ten seconds' exposure to the vapor atmosphere (which is dry enough so as not to moisten film), the resistance dropped to .1 of an ohm. It will be observed that the coating changes in color from gold bronze or brass color to a reddish copper coating indicating effect of galvanic action on the zinc in the alloy. The process preferred consists of coating the film with a thin layer of bronze powder such as with an alloy containing 20% zinc 80% copper, baking the coating so as to eliminate all volatile components such as the solvent for the bonding agent, then passing the film into a chamber having the vapor or gas derived from a surface of hydrochloric acid, then heating the film again to avoid having any excess condensed acid or water vapor on the finished film. Thereafter, the film is passed through a drying oven and finally through a pair of heated rollers, the material being then ready for use. The vapor causes the galvanic reduction of the cuprous and other oxides on the surface of the particles and also has a slight dissolving action on other metals, such as zinc, which are present in the bronze. Due to the character of the metal film it should be used soon after production or kept in a non-oxidizing atmosphere.

If it is desired to increase the thickness of the electrodes this may conveniently be done by electroplating over the sprayed coatings with metals such as zinc, tin, cadmium, etc. However, for general use as a capacitance, I have found that the thin spray of bronze is adequate when treated by either of the above methods.

In the construction of the capacitance, I have found it desirable to utilize a bronze coating on both sides of the dielectric films as I have ascertained, with the hard film surface of materials such as polystyrene, dialyzed regenerated cellulose, paper impregnated with plasticized styrene, ethyl cellulose, and cellulose acetate that a portion of the power factor loss experienced in the past, is due to lack of intimate bonding of electrodes to the sheet. By providing an integral structure as described, losses due to imperfect contact between the dielectric and electrodes are reduced to a minimum. The capacitance obtained will be dependent upon the specific inductance capacitance of the material used as the film. Furthermore, drifting and variation in capacitance due to changes in contact of the electrode with the dielectric is avoided.

In order to more completely describe the invention reference is made to the drawing.

In Fig. 1 the roll 1 of film 2 passes via pulley 3 between bronze spray guns 4 and 5 which keep the coating from edges of the film. Thereafter the coated film passes up through oven 6 which dries the coating upon the film and expels the solvent. After drying, the film via roller 7 passes into chamber 8 containing a tray of hydrochloric acid 10 and over rollers 9. The hydrochloric acid vapor 11 reacts with the coating, causing a galvanic action between the different metals constituting the coating and changes the coating from a non-conductive to a conductive state.

Thereafter the conductive coated film passes via roller 12 into oven 13 which eliminates any excess hydrochloric acid vapor or condensed moisture. Finally, via roller 14 the film is assembled into roll 15.

Instead of passing the bronze coated sheet over the hydrochloric acid, it is also possible to pass the coated sheet directly into and through the hydrochloric acid solution, in which case it is advisable to thereafter wash the treated material with hot water to remove excess acid or by-products, finally drying the processed coated sheet by passing it through a drying oven. For the production of dielectric electrode members, this method is not as satisfactory nor as convenient as the hydrochloric acid vapor treatment.

The amount of binder used should be limited so as not to form a complete physical insulating layer around the particles but should be sufficient to firmly hold the metal particles upon the flexible organic sheet dielectric. I find a mixture of 2% nitrocellulose in amylacetate and 20% by weight of finely divided bronze powder to be especially suitable, the cellulose film formed thereby being porous so as to allow contact between the particles.

Other binders can be used, for example a 3% solution of styrene plasticized with the dimer of dihydronaphthalene in the order of 25% of the styrene content.

Instead of spraying the bronze coating on to the dielectric sheet, the material may be rolled on. Another method of application is to coat the surface of the film with the binder such as for example a 5% solution of styrene containing 25% dimer of dihydronaphthalene in xylol, and prior to drying, applying the bronze powder and thereafter removing excess powder after baking and drying the coating.

In Fig. 2 is shown a simple condenser structure comprising plasticized styrene film dielectric 16 having electrodes 17 and 18 coated on opposite sides thereof according to the process of this invention.

In Fig. 3 processed regenerated sheet cellulose films 21 and 27 having sprayed bronze coatings 22, 23 and 28, 29 respectively, as well as uncoated margins 24, 25 and 30, 31, are shown rolled into a condenser structure. The uncoated insulating marginal spaces are provided by the use of masks in the coating process. Copper foil terminal 26 makes contact with bronze coating 22 and copper foil terminal 32 makes contact with bronze coatings 23 and 28 which are common. After the condenser has been completely wound, it is placed in a moisture proof container and for further protection may be impregnated with a wax or oil in a manner well known to the art.

The bronze powders preferred for the coating material are preferably those formed by alloys or mixtures of copper with a metal such as zinc, cadmium, magnesium, beryllium, aluminum or other suitable element which will galvanically react with copper in the presence of an halogen acid vapor. Instead of using particles of copper-zinc, it will also be possible to use intermixed powders of copper and zinc or other suitable metal and obtain the desired galvanic action. However, the use of bronze particles, particularly copper-zinc particles is preferred as giving the most useful results. Likewise I prefer to use hydrochloric acid vapor or gas although the vapors of hydrofluoric, hydrobromic and hydroiodic acid are useable, but less practicable.

While the invention particularly describes the use of flexible dielectric films, it is to be recognized that the process can also be applied to other dielectric materials such as pressed mica, etc.

This application is a continuation in part of my co-pending applications, Serial Number 166,928, filed October 2, 1937 for "Method of making electric condenser", Serial Number 205,209 filed April 30, 1938, Serial Number 206,372 filed May 6, 1938, and Serial No. 287,938, filed August 2, 1939 for "Process for making electrostatic condensers and the like."

What is claimed is:

1. The method of making a dielectric-electrode member for electrostatic condensers which comprises coating a flexible organic sheet material with copper bronze particles and a water-proof carrier bonding said particles to said dielectric, said bronze particles having normally a high resistance layer of superficial thickness at the surfaces thereof, subjecting said coated sheet to the action of a reducing acid capable of reacting with said bronze particles to convert said high resistance surfaces to a conductive state.

2. The method of making a dielectric-electrode member for electrostatic condensers which comprises coating flexible cellulose sheet material constituting the dielectric with a mixture of copper bronze particles in an organic water-proof binder, said bronze particles having high resistance surfaces of superficial thickness, drying said coating, subjecting the coated sheet to the action of hydrochloric acid to convert the high resistance surfaces of the bronze particles to a conductive condition, said coating constituting the electrode.

3. The method of making a dielectric-electrode assembly for electrostatic condensers which comprises coating a dielectric base with finely divided copper base particles and an organic binder, drying said coating upon said base, said coating being characterized by high contact resistance at the particle interfaces, reacting hydrochloric acid with said interfaces so as to bring about high interparticle conductivity.

4. The method of making a dielectric-electrode member for electrostatic condensers which comprises coating regenerated sheet cellulose constituting the dielectric of said condenser, with a layer of finely divided copper bronze powder and a carrier adapted to bind said powder to the sheet, said coating being substantially non-conductive along its length due to high resistance between the bronze particles, subjecting said coating to the action of hydrochloric acid so as to reduce said interparticle resistance and to cause said coating to become highly conductive along its length, said coating constituting the electrode.

5. The method of making a dielectric-electrode member for electrostatic condensers which comprises coating a flexible organic sheet material with copper bronze particles and an organic carrier bonding said particles to said dielectric, said particles having normally a high resistance layer of superficial thickness at the surfaces thereof, subjecting said coated sheet to the action of a reducing acid capable of reacting with said bronze particles to convert said high resistance surfaces to a conductive state.

6. The method of making a dielectric-electrode member for electrostatic condensers which comprises coating a flexible organic sheet material with copper bronze particles and a water-proof carrier bonding said particles to said dielectric, said bronze particles having normally a high resistance layer of superficial thickness at the surfaces thereof, subjecting said coated sheet to the action of the vapor of a reducing acid capable of reacting with said bronze particles to convert said high resistance surfaces to a conductive state.

7. The method of making a dielectric-electrode member for electrostatic condensers which comprises coating flexible cellulose sheet material constituting the dielectric with a mixture of copper bronze particles in an organic water-proof binder, said bronze particles having high resistance surfaces of superficial thickness, drying said coating, subjecting the coated sheet to the action of hydrochloric acid vapor to convert the high resistance surfaces of the bronze particles to a conductive condition, said coating constituting the electrode.

8. The method of making a dielectric-electrode assembly for electrostatic condensers which comprises coating a dielectric base with finely divided copper base particles and an organic binder, drying said coating upon said base, said coating being characterized by high contact resistance at the particle interfaces, reacting hydrochloric acid vapor with said interfaces so as to bring about high interparticle conductivity.

9. The method of making a dielectric-electrode member for electrostatic condensers which comprises coating regenerated sheet cellulose constituting the dielectric of said condenser, with a layer of finely divided copper bronze powder and a carrier adapted to bind said powder to the sheet, said coating being substantially non-conductive along its length due to high resistance between the bronze particles, subjecting said coating to the action of hydrochloric acid vapor so as to reduce said interparticle resistance and to cause said coating to become highly conductive along its length, said coating constituting the electrode.

10. The method of making a dielectric-electrode member for electrostatic condensers which comprises coating a flexible organic sheet material with copper bronze particles and an organic carrier bonding said particles to said dielectric, said particles having normally a high resistance layer of superficial thickness at the surfaces thereof, subjecting said coated sheet to the action of the vapor of a reducing acid capable or reacting with said bronze particles to convert said high resistance surfaces to a conductive state.

11. A copper bronze dielectric-electrode member comprising a dielectric sheet having a coating of finely divided copper-bronze particles intimately bonded thereto characterized by the absence of oxide insulating films on said particles, said dielectric-electrode member being substantially identical with that resulting from the process defined in claim 1.

12. A copper bronze dielectric-electrode member comprising a dielectric sheet having a coating of finely divided copper-bronze particles intimately bonded thereto characterized by the absence of oxide insulating films on said particles, said dielectric-electrode member being substantially identical with that resulting from the process defined in claim 6.

SAMUEL RUBEN.